United States Patent
Chai et al.

(10) Patent No.: US 9,092,589 B2
(45) Date of Patent: Jul. 28, 2015

(54) INTEGRATED CIRCUIT DESIGN FLOW WITH DEVICE ARRAY LAYOUT GENERATION

(71) Applicant: TAIWAN SEMICONDUCTOR MANUFACTURING COMPANY, LTD., Hsinchu (TW)

(72) Inventors: Ching-Yu Chai, Hsinchu (TW); Chin-Sheng Chen, Taoyuan (TW); Wei-Yi Hu, Zhubei (TW); Jui-Feng Kuan, Zhubei (TW)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 0 days.

(21) Appl. No.: 14/193,527

(22) Filed: Feb. 28, 2014

(65) Prior Publication Data

US 2015/0154333 A1 Jun. 4, 2015

Related U.S. Application Data

(60) Provisional application No. 61/910,172, filed on Nov. 29, 2013.

(51) Int. Cl.
*G06F 17/50* (2006.01)

(52) U.S. Cl.
CPC ........ *G06F 17/5068* (2013.01); *G06F 17/5081* (2013.01)

(58) Field of Classification Search
CPC .......................... G06F 17/5068; G06F 17/5081
See application file for complete search history.

(56) References Cited

U.S. PATENT DOCUMENTS

| | | | | |
|---|---|---|---|---|
| 6,499,129 | B1 * | 12/2002 | Srinivasan et al. | 716/113 |
| 6,546,536 | B1 * | 4/2003 | Nolan | 716/102 |
| 8,176,445 | B1 * | 5/2012 | Qian | 716/52 |
| 8,191,018 | B1 * | 5/2012 | Molesa et al. | 716/55 |
| 8,224,637 | B1 * | 7/2012 | Sowards et al. | 703/14 |
| 8,510,701 | B2 * | 8/2013 | Ko et al. | 716/127 |
| 8,621,409 | B2 * | 12/2013 | Lee et al. | 716/119 |
| 8,631,382 | B2 * | 1/2014 | Wang et al. | 716/136 |
| 8,701,055 | B1 * | 4/2014 | Lee et al. | 716/54 |
| 8,726,207 | B2 * | 5/2014 | Jiang et al. | 716/110 |
| 8,769,456 | B1 * | 7/2014 | Krishnan et al. | 716/110 |
| 8,775,993 | B2 * | 7/2014 | Huang et al. | 716/112 |
| 2008/0034332 | A1 * | 2/2008 | Anikin et al. | 716/2 |
| 2011/0055782 | A1 * | 3/2011 | Drennan et al. | 716/112 |
| 2012/0304146 | A1 * | 11/2012 | Jiang et al. | 716/139 |
| 2014/0068540 | A1 * | 3/2014 | Huang et al. | 716/122 |

* cited by examiner

*Primary Examiner* — Naum B Levin
(74) *Attorney, Agent, or Firm* — Lowe Hauptman & Ham, LLP

(57) ABSTRACT

A system for designing an integrated circuit generates a schematic of the integrated circuit based on a set of system design rule constraints. The system also receives a proposed device array layout from a device array design module. The device array design module is configured to generate the proposed device array layout free from the set of system design rule constraints. The system further generates a revised schematic of the integrated circuit including the proposed device array layout. The system additionally determines if the revised schematic violates one or more of the system design rule constraints.

20 Claims, 4 Drawing Sheets

INTEGRATED CIRCUIT DESIGN FLOW WITH DEVICE ARRAY LAYOUT GENERATION

PRIORITY CLAIM

The present application claims priority to U.S. Provisional Patent Application No. 61/910,172, filed Nov. 29, 2013, the disclosure of which is incorporated herein by reference in its entirety.

BACKGROUND

Integrated circuit design systems implement processes that often include generating a circuit schematic of an integrated circuit being designed, performing a pre-layout simulation on the circuit schematic to simulate a performance of the integrated circuit, generating a layout of the integrated circuit, and performing a design verification on the layout of the integrated circuit. Integrated circuit design systems sometimes perform a post-layout simulation on the layout of the integrated circuit taking various layout-dependent effects (LDEs) into account, to reflect actual circuit performance more accurately. The integrated circuit design system typically compares the simulated performance characteristics to the design specification to approve or disapprove of a design.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion. The drawings of one or more embodiments, incorporated herein by reference, include the following.

DETAILED DESCRIPTION

Figure 1:
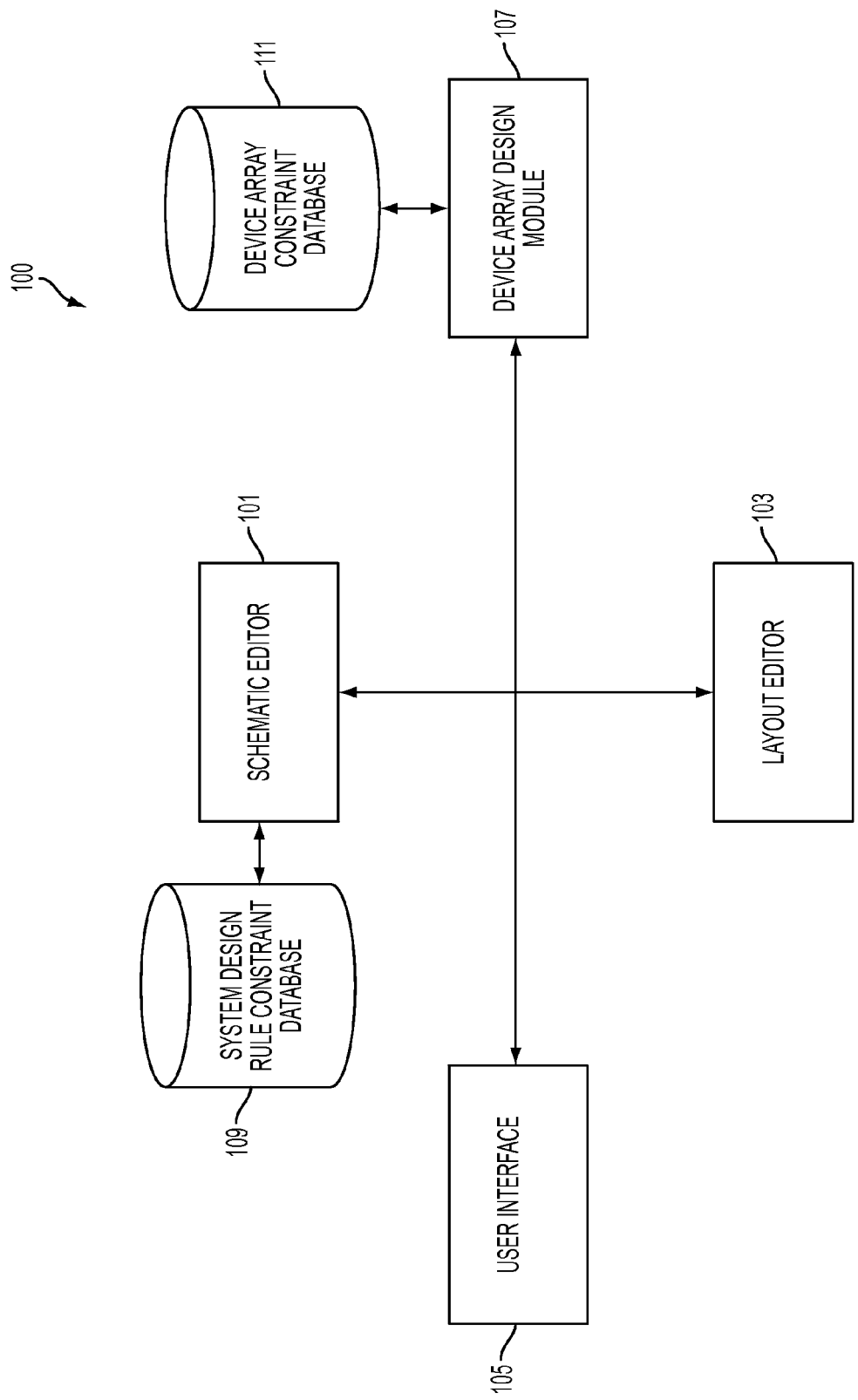
FIG. 1 is a block diagram of an integrated circuit design system for designing an integrated circuit having a device array free from a set of system design rule constraints, in accordance with one or more embodiments.

The following disclosure provides many different embodiments, or examples, for implementing different features of the invention. Specific examples of components and arrangements are described below to simplify the present disclosure. These are examples and are not intended to be limiting.

In an integrated circuit design process, a circuit schematic of an integrated circuit being designed is generated first, for example, in a schematic editor. A pre-layout simulation is performed on the circuit schematic to simulate a performance of the integrated circuit. Since the layout of the integrated circuit has not yet been created at the time the pre-layout simulation is performed, layout-dependent effects (LDEs) of the layout of the integrated circuit cannot be taken into account in the pre-layout simulation. Instead, in the pre-layout simulation, default values of the LDEs are assumed.

Following the pre-layout simulation, the layout of the integrated circuit is generated, for example, using a layout editor. A design verification is then performed on the layout, wherein the design verification typically includes an LDE parameter extraction, for example.

A post-layout simulation is then performed on the layout. In the post-layout simulation, the LDEs are taken into account, so that the generated circuit performance parameters reflect the actual circuit more accurately. The circuit performance parameters are then compared to the design specification. If the circuit performance parameters meet the requirement of the design specification, the design can be approved. Otherwise, the design process reverts back to the schematic generation and editing steps, and the steps including the pre-layout simulation, the layout creation, the design verification, and the post-layout simulation are repeated to modify the design. The process is repeated until the circuit performance parameters meet the requirements of the design specification.

Some integrated circuit design systems implement parameterized cell (p-cell) methodologies to automatically create a device array based on an integrated circuit manufacturers particular design rule manual (DRM). Conventional p-cell methods use, for example, p-cell symbols, schematics, and layout views when developing a device array layout for inclusion in the schematic that is subjected to the pre-layout simulation. But, p-cell methods based on the manufacturer's DRM do not have precise LDE data for inclusion at the schematic design level. For example, if the integrated circuit design system changes the schematic in any way such as, but not limited to, flattening the p-cell device array or re-arranging any devices in the schematic design, the LDEs are not updated in real-time at the schematic level. Additionally, common p-cell methods are reliant on various process design kit (PDK) features such as, but not limited to, at least some of a PDK's preset device parameters or component description formats (CDFs), bags, and/or callback functions. Common p-cell methods are also not readable to identify circuit structures such as differential pairs, current mirrors, cascodes, etc., on a p-cell symbol.

Some integrated circuit design systems use a connectivity-driven flow effect that is only able to cross-probe a device array or a device array's pins/nets between a p-cell symbol and a p-cell layout. Such integrated circuit design systems cannot cross-probe an instance or an instance's pins/nets inside the device array between the p-cell schematic and the p-cell layout. Common integrated circuit design systems are also unable to share a common guard ring for multi-device arrays represented by a p-cell.

Some integrated circuit design systems are completely dependent on PDK rules and include a stand-alone device array library. Common stand alone device array libraries include device arrays that consist of, for example, p-cell symbols, p-cell schematics, p-cell layouts, CDFs, Bags, and callback functions. The stand alone libraries inherit callback functions from the PDK. This reliance on design rules associated with a PDK system limits LDE annotation or updating which causes various processes to be needlessly repeated because various errors or deviations from the design specifications may be discovered during a later process.

FIG. 1 illustrates a block diagram of an integrated circuit design system 100 for designing the layout of an integrated circuit have a device array that is free from a set of system design rule constraints, in accordance with one or more embodiments.

The integrated circuit design system 100, in some embodiments, makes it possible to reduce the number of iterations performed during the layout design process by providing a unique and complete design flow that generates a device array layout automatically. The integrated circuit design system 100 annotates any LDEs attributed to or caused by the inclusion of a device array layout, in real-time, to a generated integrated circuit schematic such that the LDEs are accounted for in the schematic subjected to the pre-layout simulation. The integrated circuit design system 100 also makes it possible to verify the accuracy of an electrical design or performance of the layout compared to the design specifications.

In some embodiments, integrated circuit design system 100 includes a schematic editor 101, layout editor 103, a user interface 105, a device array design module 107, a system design rule constraint database 109, and a device array constraint database 111 that are communicatively coupled. In one or more embodiments, schematic editor 101, the layout editor 103, and the device array design module 107 are one or more sets of executable instructions for execution by a processor or similar device.

Schematic editor 101 is configured to be used to generate and edit circuit schematics of integrated circuits that are being designed. Schematic editor 101 is also configured to generate a pre-simulation of the circuit schematics. According to one or more embodiments, schematic editor 101 includes a set of executable instructions for generating or causing the pre-simulation of the schematic. In other embodiments, a separate device (e.g., a simulator) in communication with the schematic editor 101 is used to generate the pre-layout simulation of the schematic. Layout editor 103 is configured to generate and edit layouts of the integrated circuits in accordance with the circuit schematics generated by the schematic editor 101. Device array design module 107 is configured to, based on one or more received instructions, generate a device array layout to be communicated to the schematic editor 101 for inclusion in the circuit schematic of the integrated circuit for the pre-layout simulation.

User interface 105 is configured to receive and display the circuit schematic from schematic editor 101, the layout from layout editor 103, and the device array layout from the device array design module 107, and any calculated circuit performance parameters. User interface 105 is also configured to receive user inputs to adjust the circuit schematics, the device array layout, and the layout of the integrated circuit, and to select specific devices in order to display circuit performance parameters of specific devices selected by a user.

An integrated circuit includes a plurality of devices, and the integrated circuit design system 100 enables design and layout optimization at a device level (i.e., one or more devices) within the integrated circuit according to one or more embodiments.

In some embodiments, the schematic editor 101 generates a schematic of the integrated circuit based on a set of system design rule constraints. The schematic editor 101 queries the system design rule constraint database 109 for the set of applicable system design rules and generates the schematic of the integrated circuit. The schematic of the integrated circuit includes one or more devices and also includes information for simulation purposes regarding LDEs. In some embodiments, the information regarding LDEs is a default data set.

The schematic editor 101 determines if, for example, the integrated circuit being designed includes, or is to include, a device array. If so, the schematic editor 101 communicates the device array details to the device array design module 107. If not, the schematic editor 101 continues on to conduct a pre-layout simulation of the schematic of the integrated circuit.

If a device array is to be included in the integrated circuit being designed, the user interface 105 provides access to a constraint manager of the device array design module 107 that makes it possible to construct a device array layout that is free from the set of system design rules applied by the schematic editor 101. In some embodiments, the device array design module 107 optionally proceeds to generate an array design layout based on the set of system design rules applied by the schematic editor 101. The generated array design layout, in some embodiments, is created by way of a user input received by the user interface 105. The generated device array design layout is added to the schematic and the schematic editor 101 performs the pre-layout simulation. In some embodiments, the generated device array layout is stored in the device array constraint database 111 as a constraint view for later recall.

If, however, the device array design module 107 is instructed to generate a proposed device array layout that is free from the applied set of system design rules, the device array design module 107 makes it possible to generate a device array layout based on at least on user input received by way of the user interface 105 and/or based on a separate set of device array design rule constraints that are separately managed by the device array design module 107. The generated device array layout that is free of the system design rule constraints, in some embodiments, is stored as a constraint view in the device array constraint database 111 for later recall. In some embodiments, the device array design module 107 generates one or more device array design rule constraints that are any of user customized device array design rule constraints input by way of the user interface 105 or one or more stored constraint views. In embodiments, the one or more device array design rule constraints are stored in the device array constraint database 111. Accordingly, in some embodiments, a proposed device array layout is based on an applied set of device array design rule constraints recalled from the device array constraint database 111.

In some embodiments, a proposed device array layout generated by the device array design module 107 is a schematic driven layout. For example, the user interface 105, in some embodiments, provides an interactive schematic view of the schematic generated by the schematic editor 101. The device array design module 107 one of generates a proposed device array layout based on one or more known features of the schematic and any device array design rule constraints or freely enables the user to develop a device array layout. In either case, one or more devices in the schematic may move or change within the schematic and/or any of the devices in the device array may introduce, the movement of pre-existing devices and/or the introduction of the device array may, for example, introduce one or more LDEs. Accordingly, the device array design module 107 causes the one or more LDEs to be communicated to the schematic editor 101 such that the LDEs initially in the schematic are back-annotated and updated to reflect the changes made by the device array design module 107. Back-annotating the LDEs to the schematic editor 101 results in a pre-layout simulation that is more accurate than the pre-layout simulation would have been if it were based on either default or outdated LDEs. A more accurate pre-layout simulation reduces the number of refinement or revision iterations that may be necessary to account for errors or deviations from one or more design specifications or system design rule constraints.

In some embodiments, the device array design module 107 is configured to determine a pattern gradient density of the proposed device array layout of the integrated circuit and provides real-time density aware verification of devices, such as, OD, PO, MOOD, and MOPO density checks, or density checks of other suitable devices in a device array.

In some embodiments, the device array design module 107 is an add-on component to an integrated circuit design system that may or may not include a conventional device array library such as that discussed above. In either case, the device array design module 107, in some embodiments, is a plug and play add-on that enables device array layout generation that is completely free of any system design rule constraints.

Whether the device array design module 107 is an add-on or a component of an integrated system such as the integrated circuit design system 100, the device array design module 107 provides design array layouts that are more readable on the schematic design structures, such as a differential pairs, current mirrors, cascodes, or other suitable structures because these structures are not restricted by the set of system design rule constraints. The device array design module 107 also provides seamless connectivity-driven flow on devices and pins/nets inside a device array between schematic and layout views. The device array design module 107 is further able to support abutment, add pins, and share guard rings easily.

In some embodiments, the device array design module 107 is applicable to advanced processes, such as N16 FinFET processes and beyond. For example, the device array design module 107 makes it possible to provide accurate array placement, insert identical dummy structures, insert mid-end-of-line (MEOL) dummy structures, perform density checks, create guard rings, create common OD abutments and pin shapes, back-annotate LDE parameters that affect pre-layout simulations and development cycle times, provide seamless connectivity-driven flow on devices and pins/nets inside a device array between the schematic and layout views, and generally simulate or provide information about any layout behavior.

The device array design module 107, in some embodiments, directly sets up constraints on selected devices through electronic design automation tools that link with a manufacturer's device array application protocol interface. In some embodiments, the device array design module 107 makes it possible to access the design array constraint database 111 to create a complete device array in a design layout view, In some embodiments, the schematic editor 101 receives the generated proposed device array layout from a device array design module 107 and generates a revised schematic of the integrated circuit including the proposed device array layout. This revised schematic of the integrated circuit, which includes the proposed device array layout, is, as discussed above, optionally free of any system design rule constraints. As such, the schematic editor 101 performs the pre-layout simulation to determine if the revised schematic violates one or more of the system design rule constraints. If the revised schematic violates any system design rule constraints, the schematic editor 101 repeats the device array generation until a schematic is generated that passes the pre-layout simulation.

If the revised schematic passes the pre-layout simulation, the layout editor 103 generates a layout of the integrated circuit based on the revised schematic of the integrated circuit. In some embodiments, the layout editor 103 is configured to compare the revised schematic of the integrated circuit to a layout design of the semiconductor device to determine if the generated layout conforms to the design specifications associated with the integrated circuit being designed. If yes, the integrated circuit is optionally produced. If not, the integrated circuit design system 100 one of refines the schematic or refines the layout and repeats the processes discussed above until a layout of the integrated circuit is generated that passes the design specification performance check.

Figure 2:
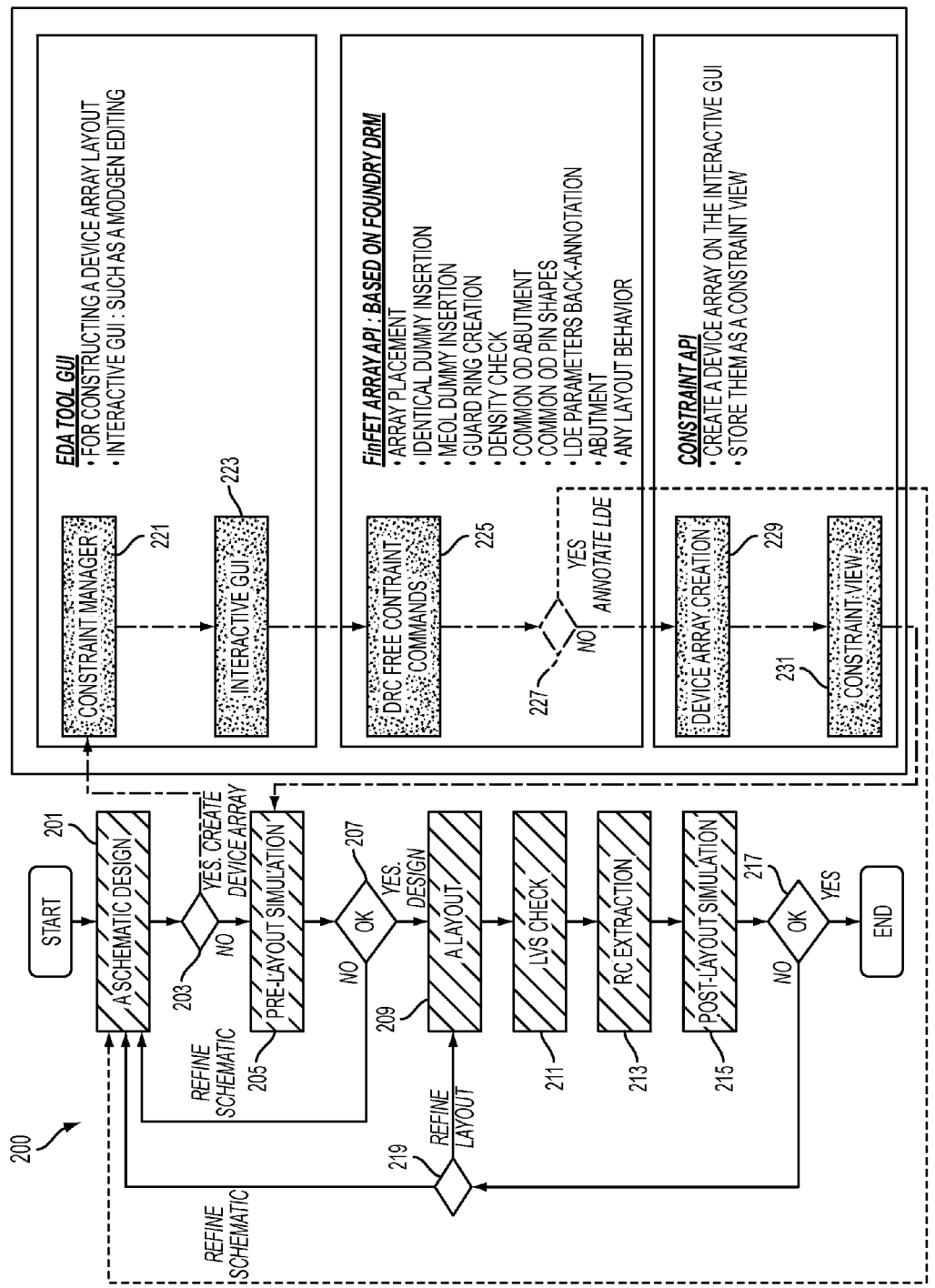
FIG. 2 is a flow chart of a method for designing an integrated circuit having a device array free from a set of system design rule constraints, in accordance with one or more embodiments.

FIG. 2 is a flowchart of a method 200 of designing an integrated circuit having a device array free from a set of system design rule constraints. Method 200 begins with step 201 in which a processor such as processor 400 or a control module implemented in chip set 400 discussed in FIG. 4, executes an instruction to generate a schematic design of an integrated circuit. In step 203, a determination is made regarding whether a device array is to be created or edited, or not. If no, the method continues to step 205 in which a pre-layout simulation is performed. In some embodiments, the set of system design rule constraints are checked at the revised schematic design stage before the pre-layout simulation is performed. In step 207, a determination is made whether the circuit design represented in the schematic meets the design specification or not. If no, the method continues to step 201 to refine the circuit design in the schematic in order to pass the design specification. If yes, the method continues to step 209 in which a layout of the integrated circuit is generated. In some embodiments, a design rule check is performed by a DRC tool that is either in communication with, or included as a part of, the layout editor. In step 211, the layout is compared with the schematic. In some embodiments, a layout editor generates the layout and is either in communication with, or includes, a layout versus schematic (LVS) tool configured to compare a schematic design of the semiconductor device to a layout design of the semiconductor device. In step 213, a resistance-capacitance (RC) extraction is performed by an RC extraction tool on the schematic design or the layout and creates a new extracted netlist, view, or database which consists of parasitic resistance-and-capacitance networks/structures and the intrinsic circuit design for the post-layout simulation purpose. In some embodiments, the RC extraction tool is either in communication with, or included as a part of, the layout editor. In step 215, the post-layout simulation is performed by using the extracted netlist, view, or database. In step 217, a design specification check is performed from results of the post-layout simulation. If the post-layout simulation meets the design specification, the method will continue to other procedures. If post-layout simulation fails on the design specification, the method continues to step 219.

In step 219, a determination is made to either refine the layout or refine the schematic. If the layout is refined, the method continues to step 209. If the schematic is refined, then the method continues to step 201.

Returning back to the decision discussed above with respect to step 203, if at step 203, a device array is to be created or edited and added to the schematic, the method continues to step 221 in which an electronic design automation tool accesses a constraint manager. In step 223, an interactive graphical user interface is actuated. In step 225, a system design rule-free command module is accessed to provide a plurality of device array layout design options. The device array layout design options include, for example, array placement, identical dummy insertion, MEOL dummy insertion, guard ring creation, density check, common OD abutment, common OD pin shapes, LDE parameters back-annotation, abutment, or any suitable layout behavior. A device array design layout is created by way of user interaction with the user interface at the schematic level in which devices are inserted and/or rearranged, which sometimes causes known or assumed LDEs to change.

In step 227, a determination is made to annotate the LDE in the schematic. If yes, the LDE data is communicated to the schematic editor and the LDE data is updated. The method continues then continues from step 201 and the annotated LDE information is included in further repeated processes, reducing unnecessary iterations of the discussed method steps. If no, the method continues to step 229 in which the device array is created. In step 231, the generated device array is optionally stored as a constraint view or device array design rule constraint and the device array is communicated to the schematic editor for inclusion in the schematic in the pre-layout simulation conducted in step 205. The device array design rule constraints are optionally stored for later recall or application as sample arrays or device array design rules that will aid in increased efficiency of integrated circuit design. In some embodiments, the constraint view or the device array design rule constraints are checked on the revised schematic before the pre-layout simulation.

Figure 3:
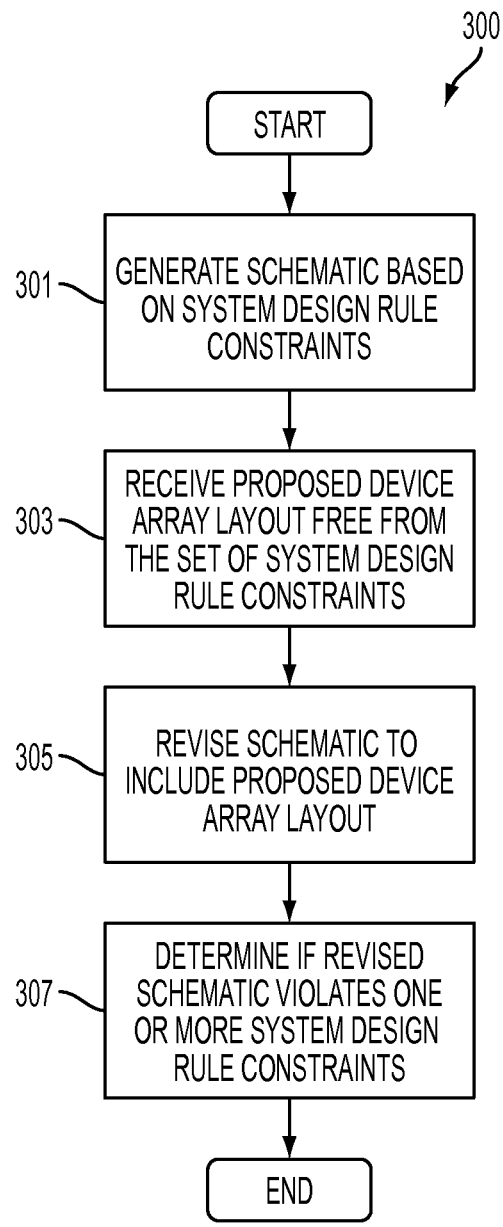
FIG. 3 is a flow chart of a method for designing an integrated circuit having a device array free from a set of system design rule constraints, in accordance with one or more embodiments.

FIG. 3 is a flow chart of a method 300 of designing an integrated circuit having a device array free from a set of system design rule constraints, in accordance with one or more embodiments. Method 300 begins with step 301 in which a processor such as processor 4 or a control module implemented in chip set 400 discussed in FIG. 4, executes an instruction to generate a schematic of the integrated circuit based on a set of system design rule constraints. In step 303, a proposed device array layout is received from a device array design module, the device array design module being configured to generate the proposed device array layout free from the set of system design rule constraints. In some embodiments, the device array design module is an add-on to a pre-established integrated circuit design system and optionally overrides one or more standard device array libraries previously associated with the integrated circuit design system. In step 305, a revised schematic of the integrated circuit including the proposed device array layout is generated. In step 307, a determination if the revised schematic violates one or more of the system design rule constraints is made.

The processes described herein for designing an integrated circuit having a device array free from a set of system design rule constraints may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 4:
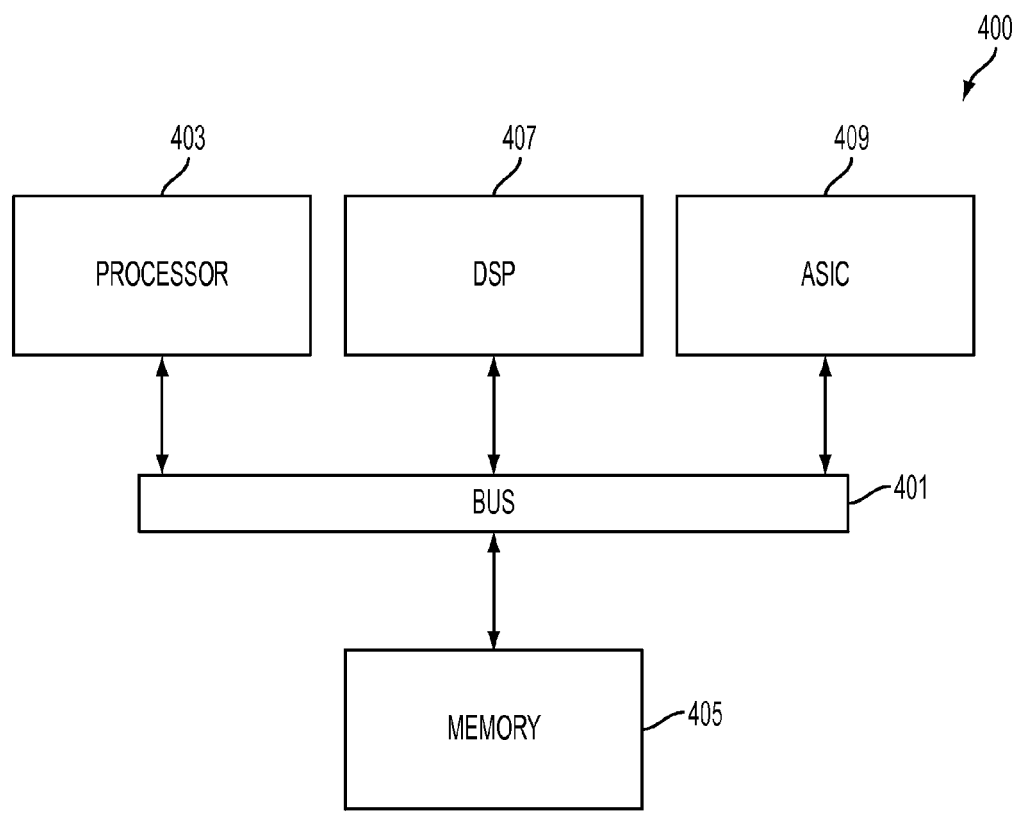
FIG. 4 is a block diagram of a general purpose computing device for implementing the design system shown in FIG. 1, in accordance with one or more embodiments.

FIG. 4 illustrates a chip set or chip 400 upon which or by which an embodiment is implemented. Chip set 400 is programmed to design an integrated circuit having a device array free from a set of system design rule constraints, as described herein, and includes, for example, bus 401, processor 403, memory 405, DSP 407 and ASIC 409 components.

The processor 403 and memory 405 are incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 400 are implemented in a single chip. It is further contemplated that in certain embodiments the chip set or chip 400 is implemented as a single "system on a chip." It is further contemplated that in certain embodiments a separate ASIC would not be used, for example, and that all relevant functions as disclosed herein would be performed by a processor or processors, e.g., processor 403. Chip set or chip 400, or a portion thereof, constitutes a mechanism for performing one or more steps of designing an integrated circuit having a device array free from a set of system design rule constraints.

In one or more embodiments, the chip set or chip 400 includes a communication mechanism such as bus 401 for passing information among the components of the chip set 400. Processor 403 has connectivity to the bus 401 to execute instructions and process information stored in, for example, the memory 405. In some embodiments, the processor 403 is also accompanied with one or more specialized components to perform certain processing functions and tasks such as one or more digital signal processors (DSP) 407, or one or more application-specific integrated circuits (ASIC) 409. A DSP 407 typically is configured to process real-world signals (e.g., sound) in real time independently of the processor 403. Similarly, an ASIC 409 is configurable to perform specialized functions not easily performed by a more general purpose processor. Other specialized components to aid in performing the functions described herein optionally include one or more field programmable gate arrays (FPGA), one or more controllers, or one or more other special-purpose computer chips.

In one or more embodiments, the processor (or multiple processors) 403 performs a set of operations on information as specified by computer program code related to designing an integrated circuit having a device array free from a set of system design rule constraints. The computer program code is a set of instructions or statements providing instructions for the operation of the processor and/or the computer system to perform specified functions.

The processor 403 and accompanying components have connectivity to the memory 405 via the bus 401. The memory 405 includes one or more of dynamic memory (e.g., RAM, magnetic disk, writable optical disk, etc.) and static memory (e.g., ROM, CD-ROM, etc.) for storing executable instructions that when executed perform the steps described herein to design an integrated circuit having a device array free from a set of system design rule constraints. The memory 405 also stores the data associated with or generated by the execution of the steps.

In one or more embodiments, the memory 405, such as a random access memory (RAM) or any other dynamic storage device, stores information including processor instructions for designing an integrated circuit having a device array free from a set of system design rule constraints. Dynamic memory allows information stored therein to be changed by the integrated circuit design system 100. RAM allows a unit of information stored at a location called a memory address to be stored and retrieved independently of information at neighboring addresses. The memory 405 is also used by the processor 403 to store temporary values during execution of processor instructions. In various embodiments, the memory 405 is a read only memory (ROM) or any other static storage device coupled to the bus 401 for storing static information, including instructions, that is not changed by the integrated circuit design system 100. Some memory is composed of volatile storage that loses the information stored thereon when power is lost. In some embodiments, the memory 405 is a non-volatile (persistent) storage device, such as a magnetic disk, optical disk or flash card, for storing information, including instructions, that persists even when the integrated circuit design system 100 is turned off or otherwise loses power.

The term "computer-readable medium" as used herein refers to any medium that participates in providing information to processor 403, including instructions for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, or another medium from which a computer can read. The term computer-readable storage medium is used herein to refer to a computer-readable medium.

One aspect of this description relates to a system for designing an integrated circuit, comprising at least one processor, and at least one memory including computer program code for one or more programs, the at least one memory and the computer program code configured to, with the at least one processor, cause the system to generate a schematic of the integrated circuit based on a set of system design rule constraints. The system is also caused to receive a proposed device array layout from a device array design module, the device array design module being configured to generate the proposed device array layout free from the set of system design rule constraints. The system is further caused to generate a revised schematic of the integrated circuit including the proposed device array layout. The system is also caused to determine if the revised schematic violates one or more of the system design rule constraints.

Another aspect of this description relates to a method of designing an integrated circuit, the method comprising generating, by a processor, a schematic of the integrated circuit based on a set of system design rule constraints. The method also comprises receiving a proposed device array layout from a device array design module, the device array design module being configured to generate the proposed device array layout free from the set of system design rule constraints. The method further comprises generating a revised schematic of the integrated circuit including the proposed device array layout. The method additionally comprises determining if the revised schematic violates one or more of the system design rule constraints.

Still another aspect of this description relates to computer readable medium comprising computer executable instructions for carrying out a method for designing an integrated circuit, the method comprising generating a schematic of the integrated circuit based on a set of system design rule constraints. The method also comprises receiving a proposed device array layout from a device array design module, the device array design module being configured to generate the proposed device array layout free from the set of system design rule constraints. The method further comprises generating a revised schematic of the integrated circuit including the proposed device array layout. The method additionally comprises determining if the revised schematic violates one or more of the system design rule constraints.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. Although features of various embodiments are expressed in certain combinations among the claims, it is contemplated that these features can be arranged in any combination and order. It is therefore intended that the protection granted hereon be limited only by the definition contained in the appended claims and equivalents thereof.

What is claimed is:

1. A system for designing an integrated circuit, comprising:
   at least one processor; and
   at least one memory including computer program code for one or more programs, the at least one memory and the computer program code configured to, with the at least one processor, cause the system to:
   generate a schematic of the integrated circuit based on a set of system design rule constraints;
   receive a proposed device array layout from a device array design module, the device array design module being configured to generate the proposed device array layout free from the set of system design rule constraints;
   generate a revised schematic of the integrated circuit including the proposed device array layout; and
   determine if the revised schematic violates one or more of the system design rule constraints.

2. The system of claim 1, wherein the system is further caused to:
   generate a set of device array design rule constraints; and
   store the set of device array design rule constraints in a device array constraint database,
   wherein the proposed device array layout is based, at least in part, on the set of device array design rule constraints.

3. The system of claim 2, wherein the system is further caused to:
   display a user interface configured to enable device array design rule constraints to be one or more of created or modified by a user based on at least one user input,
   wherein the system generates the set of device array design rule constraints based, at least in part, on the at least one user input.

4. The system of claim 1, wherein the system is further caused to:
   determine a pattern gradient density of the proposed device array layout of the integrated circuit; and
   determine if the pattern gradient density exceeds a threshold value.

5. The system of claim 1, wherein the system is further caused to:
   back-annotate one or more layout dependent effects associated with one or more of the proposed device array layout or one or more changes to the schematic of the integrated circuit.

6. The system of claim 1, wherein the proposed device array layout is created by way of a schematic driven layout.

7. The system of claim 6, wherein the system is further caused to:
   access a constraint view database to generate the proposed device array layout in the schematic driven layout accessed by a device array user interface.

8. The system of claim 1, wherein the system is further caused to:
   generate a layout of the integrated circuit based on the revised schematic of the integrated circuit; and
   compare the revised schematic of the integrated circuit to a layout design of the semiconductor device.

9. A method of designing an integrated circuit, the method comprising:
   generating, by a processor, a schematic of the integrated circuit based on a set of system design rule constraints;

receiving a proposed device array layout from a device array design module, the device array design module being configured to generate the proposed device array layout free from the set of system design rule constraints;

generating a revised schematic of the integrated circuit including the proposed device array layout; and determining if the revised schematic violates one or more of the system design rule constraints.

10. The method of claim 9, further comprising:

generating a set of device array design rule constraints; and storing the set of device array design rule constraints in a device array constraint database, wherein the proposed device array layout is based, at least in part, on the set of device array design rule constraints.

11. The method of claim 10, further comprising:

displaying a user interface configured to enable device array design rule constraints to be one or more of created or modified by a user based on at least one user input, wherein the system generates the set of device array design rule constraints based, at least in part, on the at least one user input.

12. The method of claim 9, further comprising:

determining a pattern gradient density of the proposed device array layout of the integrated circuit; and determining if the pattern gradient density exceeds a threshold value.

13. The method of claim 9, further comprising:

back-annotating one or more layout dependent effects associated with one or more of the proposed device array layout or one or more changes to the schematic of the integrated circuit.

14. The method of claim 9, wherein the proposed device array layout is created by way of a schematic driven layout accessed by a device array user interface.

15. The method of claim 14, further comprising:

accessing a constraint view database to generate the proposed device array layout in the schematic driven layout.

16. The method of claim 9, further comprising:

generating a layout of the integrated circuit based on the revised schematic of the integrated circuit; and comparing the revised schematic of the integrated circuit to a layout design of the semiconductor device.

17. A non-transitory computer readable medium comprising computer executable instructions for carrying out a method for designing an integrated circuit, the method comprising:

generating a schematic of the integrated circuit based on a set of system design rule constraints;

receiving a proposed device array layout from a device array design module, the device array design module being configured to generate the proposed device array layout free from the set of system design rule constraints;

generating a revised schematic of the integrated circuit including the proposed device array layout; and determining if the revised schematic violates one or more of the system design rule constraints.

18. The non-transitory computer readable medium of claim 17, the method for designing the integrated circuit further comprising:

generating a set of device array design rule constraints; and storing the set of device array design rule constraints in a device array constraint database, wherein the proposed device array layout is based, at least in part, on the set of device array design rule constraints.

19. The non-transitory computer readable medium of claim 18, the method for designing the integrated circuit further comprising:

displaying a user interface configured to enable device array design rule constraints to be one or more of created or modified by a user based on at least one user input;

determining a pattern gradient density of the proposed device array layout of the integrated circuit; and determining if the pattern gradient density exceeds a threshold value;

wherein the system generates the set of device array design rule constraints based, at least in part, on the at least one user input.

20. The non-transitory computer readable medium of claim 19, the method for designing the integrated circuit further comprising:

back-annotating one or more layout dependent effects associated with one or more of the proposed device array layout or one or more changes to the schematic of the integrated circuit.

* * * * *